(12) United States Patent
Schultz et al.

(10) Patent No.: US 8,625,047 B2
(45) Date of Patent: Jan. 7, 2014

(54) FLUID INGRESS RESISTANT INTERACTIVE DISPLAY DEVICE

(75) Inventors: Bernie Schultz, Bothell, WA (US); Rajesh Manoher Dighde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 13/149,723

(22) Filed: May 31, 2011

(65) Prior Publication Data

US 2012/0307183 A1   Dec. 6, 2012

(51) Int. Cl.
*G02F 1/1333* (2006.01)

(52) U.S. Cl.
USPC ......... 349/60; 349/58; 349/62; 349/153; 361/807; 361/679.01; 359/253; 359/272; 359/276

(58) Field of Classification Search
USPC ............... 349/60, 62, 58, 153–156
See application file for complete search history.

(56) References Cited

U.S. PATENT DOCUMENTS

| | | | |
|---|---|---|---|
| 4,500,171 A | 2/1985 | Penz et al. | |
| 5,838,482 A * | 11/1998 | Decroupet et al. | 359/253 |
| 5,940,153 A * | 8/1999 | Castaneda et al. | 349/58 |
| 6,215,476 B1 * | 4/2001 | Depew et al. | 345/173 |
| 6,795,153 B2 * | 9/2004 | Suzuki | 349/153 |
| 7,829,786 B2 | 11/2010 | Fuerstenberg et al. | |
| 8,031,289 B2 * | 10/2011 | Naritomi | 349/58 |
| 2007/0103069 A1 | 5/2007 | Manuela et al. | |
| 2008/0165496 A1 * | 7/2008 | Kang et al. | 361/692 |
| 2011/0109829 A1 * | 5/2011 | Mathew et al. | 349/58 |

OTHER PUBLICATIONS

"LCD Display Gasket—LCD Gasket—Touch Screen Gasket", Retrieved at <<http://elastomerics-blog.stockwell.com/2011/01/lcd-display-gasket-lcd-gasket-touch.html>>, Jan. 10, 2011, pp. 2.

Blickenstorfer, Conrad H., "Embedded System Semi-Rugged Tablet PC—MARS-3100S", Retrieved at <<http://www.advantech.in/applied-computing-systems/industrial-mobile-computers/news.aspx?doc_id=(5016E84B-F969-4366-8EC3-4D1F6FAC18D>>, Jul. 31, 2009, Pages.

Handschy, Mark, "Semiconductor Manufacturing Techniques for Ferroelectric Liquid Crystal Microdisplays", Retrieved at <<http://www.electroiq.com/index/display/semiconductors-article-display/74654/articles/solid-state-technology/volume-43/issue-5/features/flat-panel-displays/semiconductor-manufacturing-techniques-for-ferroelectric-liquid-crystal-microdisplays.html, Retrieved Date: Mar. 15, 2011, pp. 5.

"Water-Dust IP Resistant Technology", Retrieved at <<http://www.winmate.com.tw/water_dust_ruggedized_ip_proof.htm>>, Retrieved Date: Mar. 15, 2011, pp. 4.

* cited by examiner

*Primary Examiner* — Edward Glick
*Assistant Examiner* — Sang V Nguyen
(74) *Attorney, Agent, or Firm* — Alleman Hall McCoy Russell & Tuttle LLP

(57) ABSTRACT

A fluid ingress resistant interactive display device is disclosed herein. The device includes one or more gasket layers to serve as a fluid barrier to resist fluid from entering an interior of the device.

18 Claims, 7 Drawing Sheets

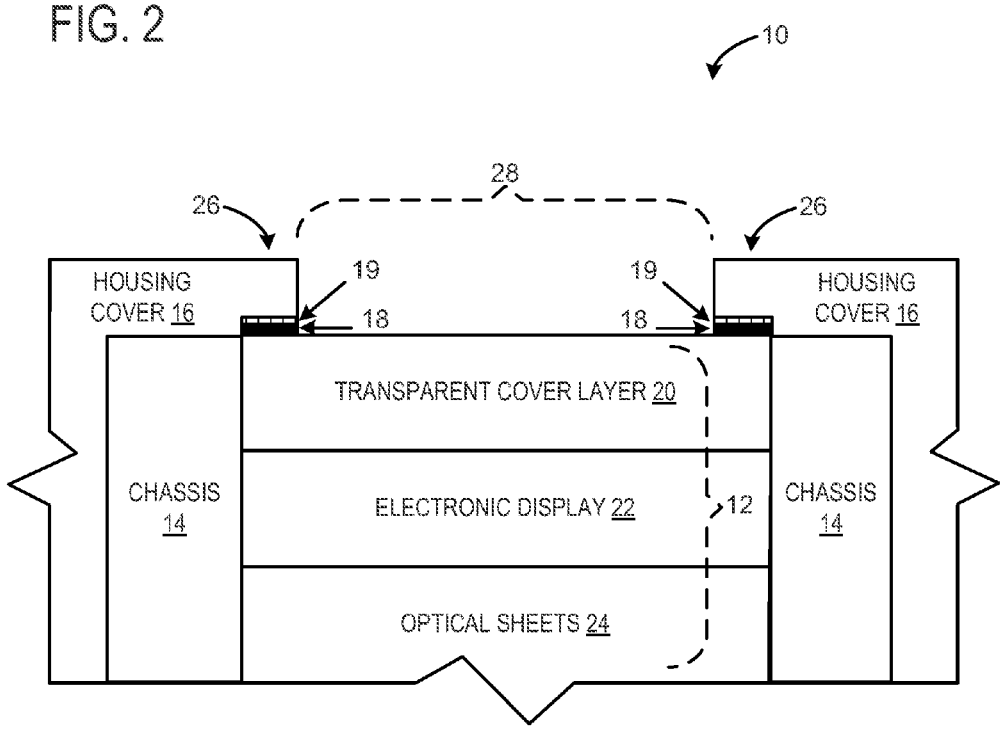
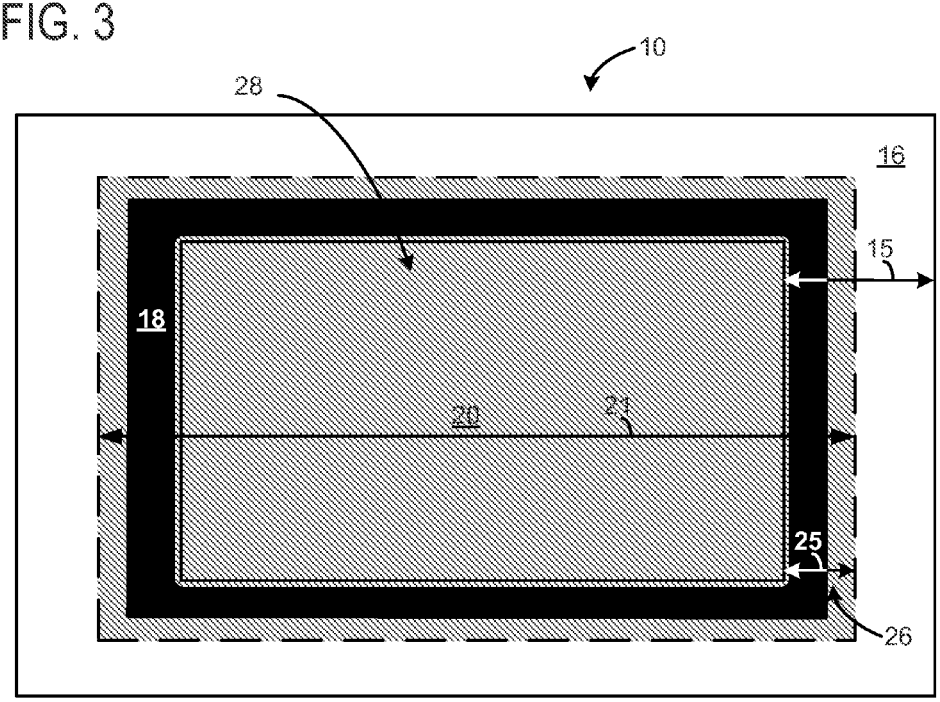

FLUID INGRESS RESISTANT INTERACTIVE DISPLAY DEVICE

BACKGROUND

Computing devices are becoming increasingly more prevalent in a wide variety of environments. As such, computing devices may be exposed to liquids, dust, and other substances. Therefore, some computing devices are designed to be more rugged in order to withstand such environments and protect the device. One approach for ruggedizing a computing device is to encase the entire device in an optically clear enclosure. However, such an approach is not ideal for interactive displays, as a thick enclosure introduces parallax resulting in a frustrating user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A fluid ingress resistant interactive display device is disclosed herein. The described interactive display device allows for exposure to fluids while decreasing fluid ingress into an interior of the interactive display device. The interactive display device includes a fluid barrier that averts fluid from entering at least a portion of the interior.

BRIEF DESCRIPTION OF THE DRAWINGS

FIG. 2 is a schematic cross sectional view of an example fluid ingress resistant interactive display device.

FIG. 3 is a top view of the fluid ingress resistant interactive display device of FIG. 2.

DETAILED DESCRIPTION

The following disclosure is directed to fluid ingress resistance interactive display devices. As described in detail below, fluid ingress resistant interactive display devices in accordance with the present disclosure may include one or more fluid barriers. As described below, a variety of different fluid barriers may be used alone or in combination. Interactive display devices in accordance with the present disclosure are thought to be better protected from fluids, thus allowing users to interact with the display device in a wide variety of environments. For example, a fluid ingress resistant interactive display device may be a large interactive table top display in a restaurant setting. In such an environment, users may set a water glass on the display, and any condensation and/or spilling that may pool from the glass is resisted from entering an interior of the interactive display device. In this way, interactive display devices may be exposed to fluids without accumulating moisture within an interior of the device. Thus, internal components of such an interactive display device may experience reduced exposure to fluid, which may otherwise adversely affect the functionality of some components. Further, aesthetically adverse affects such as staining may be at least partially avoided in such an interactive display device.

Aspects of this disclosure will now be described by example and with reference to the illustrated embodiments. Components and other elements that may be substantially the same in one or more embodiments are identified coordinately and are described with minimal repetition. It will be noted, however, that elements identified coordinately may also differ to some degree. It will be further noted that the figures included herein are schematic and generally not drawn to scale. Rather, the various drawing scales, aspect ratios, and numbers of components shown in the figures may be purposely distorted to make certain features or relationships easier to see. Furthermore, the size, shape, and spatial relationships of the various layers of the fluid ingress resistant interactive display device are not intended to be technically precise, but rather to ease understanding.

Figure 1:
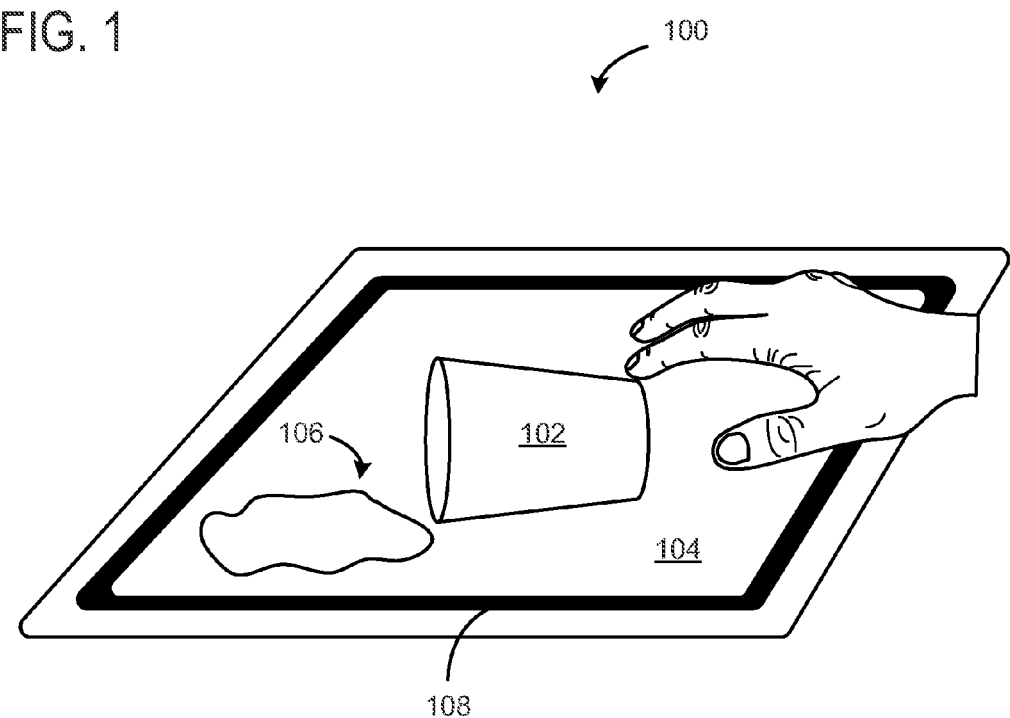
FIG. 1 shows an example fluid ingress resistant interactive display device in a horizontal orientation.

FIG. 1 shows a perspective view of an example fluid ingress resistant interactive display device 100. As shown, interactive display device 100 may be in a horizontal configuration such that a water glass 102 may rest on a surface 104 of the display. In this example, liquid 106 may spill from water glass 102 onto surface 104. However, liquid 106 may be averted from entering an interior of interactive display device 100 due to fluid barrier 108 provided around a perimeter of surface 104. For example, fluid barrier 108 may be a rubber silicone gasket, silicone foam, or virtually any suitable nonporous and impermeable material. As described in more detail below, a fluid ingress resistant interactive display device may be configured with one or more fluid barriers to protect the interactive display device from exposure to fluids. Further, the one or more fluid barriers may be positioned within an interior of the device such that the fluid barrier is not visible to the user. Additionally or alternatively, the fluid ingress resistant interactive display device may include one or more fluid channels to divert fluid away from electronic components, for example.

FIG. 2 shows a cross sectional view of an example fluid ingress resistant interactive display device 10, and FIG. 3 shows a top view of fluid ingress resistant interactive display device 10. As shown in FIG. 2, interactive display device 10 includes an optical stack 12, a chassis 14, a housing cover 16, and a gasket layer 18. As described in more detail below, gasket layer 18 may be a fluid barrier to resist fluid from entering an interior of interactive display device 10. In this way, interactive display device 10 may be exposed to fluids without accumulating moisture within an interior of the device.

Optical stack 12 may include a transparent cover layer 20, an electronic display 22, and one or more optical sheets 24. The various layers of optical stack 12 may be formed of optically clear materials configured to transmit visible light, and in some embodiments infrared light as well. Further, in some embodiments optical stack 12 may include a capacitive indium tin oxide (ITO) layer. Thus, the optical stack is comprised of materials that permit visible light and/or infrared light transmission through the optical stack.

Transparent cover layer 20 may serve as a protective layer for interactive display device 10. As such, transparent cover layer 20 may be made of chemically strengthened glass, which is provided as one non-limiting example. Transparent cover layer 20 may be coupled directly to electronic display 22 via a bonding material or an adhesive, or transparent cover layer 20 may be bonded to one or more optical sheets, as described below.

Electronic display 22 may be a light modulating device such as a liquid crystal display (LCD) or an organic light emitting diode (OLED) display. Electronic display 22 may be configured as a touch sensitive or multi-touch sensitive display, and it will be appreciated that virtually any touch sensitive technology may be employed. As non-limiting examples, an active pixel sensor (APS), or a capacitive layer configured to detect touch on the top surface of the display through changes in detected capacitance may be used.

The one or more optical sheets 24 may include a polarizing layer, a diffusing layer, an antireflective film, an antiglare film, a conductive film, a privacy film, an electromagnetic interference filter, etc. Further, it will be appreciated that the optical sheets 24 may include more than one of the aforementioned layers, films, and filters, etc. For example, optical sheets 24 may include a plurality of diffusing layers, which is provided as one non-limiting example. It will be appreciated that while FIG. 2 shows the one or more optical sheets 24 positioned below electronic display 22, such that electronic display 22 is positioned between transparent cover layer 20 and optical sheets 24, other configurations are possible. For example, additionally or alternatively, one or more optical sheets may be positioned between electronic display 22 and transparent cover layer 20.

Chassis 14 may serve as a structural support for device 10 by holding optical stack 12 and serving as a mounting platform for optical stack 12. Chassis 14 may be configured in virtually any suitable way to accommodate the configuration of optical stack 12. As such, chassis 14 generally has a size and shape that is compatible with a size and shape of optical stack 12. Chassis 14 may be comprised of any suitable material, such as a metal or metal alloy, for example. It will be appreciated that chassis 14 may include one or more portions to hold optical stack 12 in place within interactive display device 10. As described below with reference to FIGS. 4-5, the chassis may be a tiered chassis in order to hold an optical stack in a tiered configuration, for example.

Turning back to FIGS. 2 and 3, housing cover 16 may serve as an outer cover of interactive display device 10. Housing cover 16 may be made of any suitable material, such as a plastic or metal. Housing cover 16 and/or chassis 14 may be configured to hold optical stack 12 in a horizontal or tilt configuration. For example, housing cover 16 may include support mounts configured to hold transparent cover layer 20 in the horizontal configuration. As one nonlimiting example, the support mounts may be legs or leg mounts. Further, as shown, housing cover 16 may include a frame rim 26 defining a viewing window 28.

As best shown in FIG. 3, frame rim 26 may be sized and shaped to overlap an entire perimeter of transparent cover layer 20. A region coinciding with an overlapped area provides a space for fluid ingress. In the illustrated embodiment, a barrier such as gasket layer 18 is used to restrict and/or eliminate fluid ingress. Housing cover 16, as described above, provides an outer cover of interactive display device 10 and is defined in one dimension at 15. As shown, housing cover 16 includes frame rim 26 which is defined in one dimension at 25. Frame rim 26 overlaps a portion of transparent cover layer 20, which is defined in one dimension at 21. Gasket layer 18 may reside within this overlapped area such that viewing window 28 is maintained.

As shown, Gasket layer 18 may be a continuous gasket layer provided around a perimeter of viewing window 28. Since gasket layer 18 serves as a fluid barrier for interactive display device 10, it is comprised of a non-porous water tight material. For example, gasket layer 18 may be made of a silicone rubber, or silicone foam such as PORON. Gasket layer 18 may be positioned between transparent cover layer 20 and frame rim 26. Further, gasket layer 18 may be fixed to frame rim 26 via a bonding material 19 and pressure fit against transparent cover layer 20. In some embodiments, an uncompressed thickness of gasket layer 18 may be larger than the space between transparent cover layer 20 and frame rim 26. However, the gasket layer 18 may be sufficiently resilient so as to compress into the space, thus forming a tighter seal.

By applying gasket layer 18 to transparent cover layer 20 without a bonding material or an adhesive, damage due to material mismatch and thermal expansion can be reduced. Further, one-sided bonding provides more flexible manufacturing tolerances.

It will be appreciated that gasket layer 18 is provided by way of example and is not meant to be limiting in any way. Gasket layer 18 may be positioned in a location different from the overlapped region as shown in FIGS. 2 and 3. Further, gasket layer 18 may be configured in virtually any shape and/or size to resist fluid ingress. In some embodiments, gasket layer 18 may include two or more interrupted strips of gasket material and a sealant or other substance to resist fluids between such strips.

In some embodiments, fluid ingress resistant interactive display device 10 may include additional gasket layers to provide additional fluid barriers to resist fluid infiltration into an interior of the device. For example, the configuration of the optical stack and/or the configuration of the chassis may include various seams into which a fluid could enter. One or more gasket layers may be used to avert fluid from entering a further interior of the device at these locations. FIGS. 4-8 illustrate various examples of alternative or additional gaskets and/or sealants for an optical stack assembly of a fluid ingress resistant interactive display device.

Figure 4:
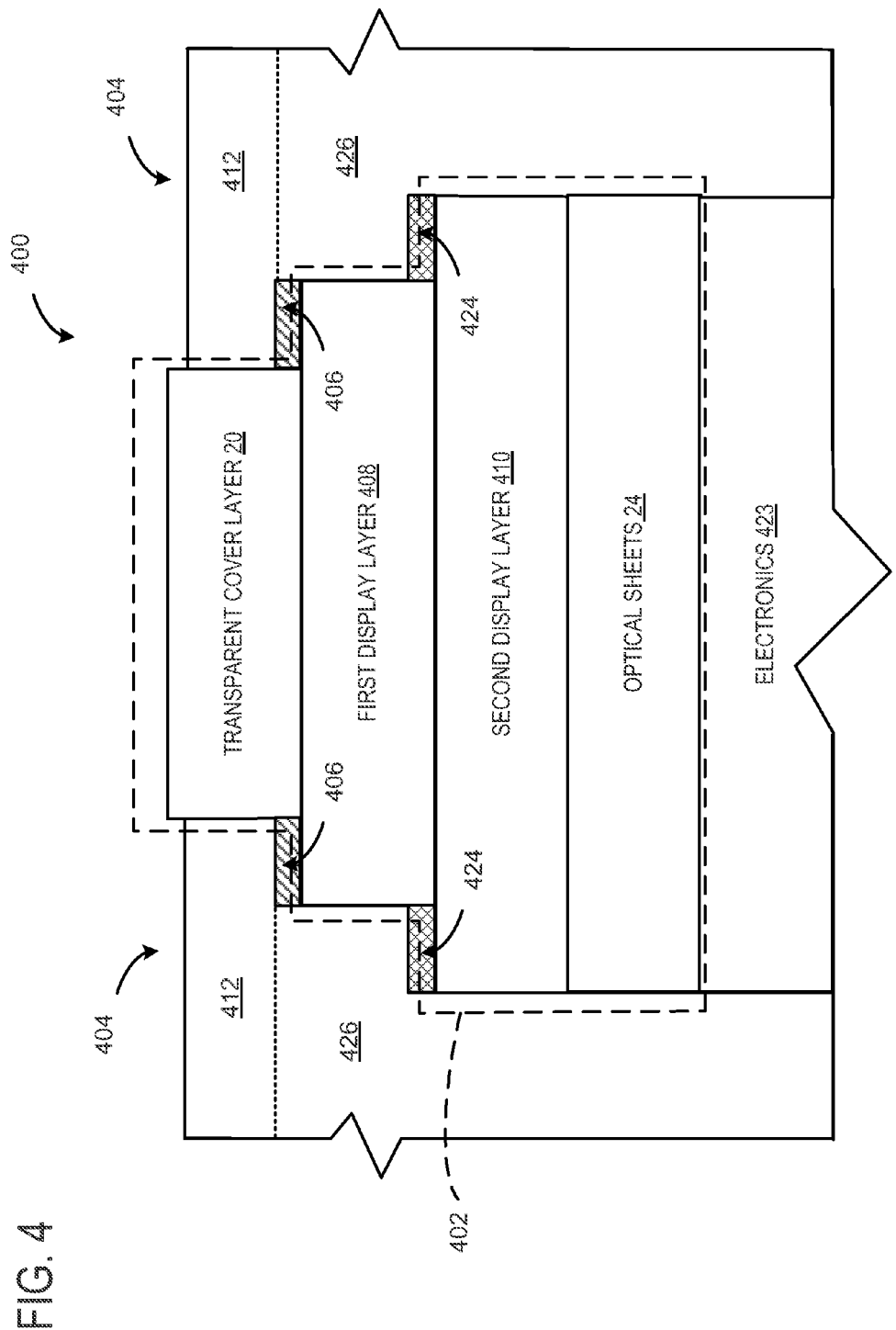
FIG. 4 is a schematic cross sectional view of an example optical stack for a fluid ingress resistant interactive display device.
Figure 5:
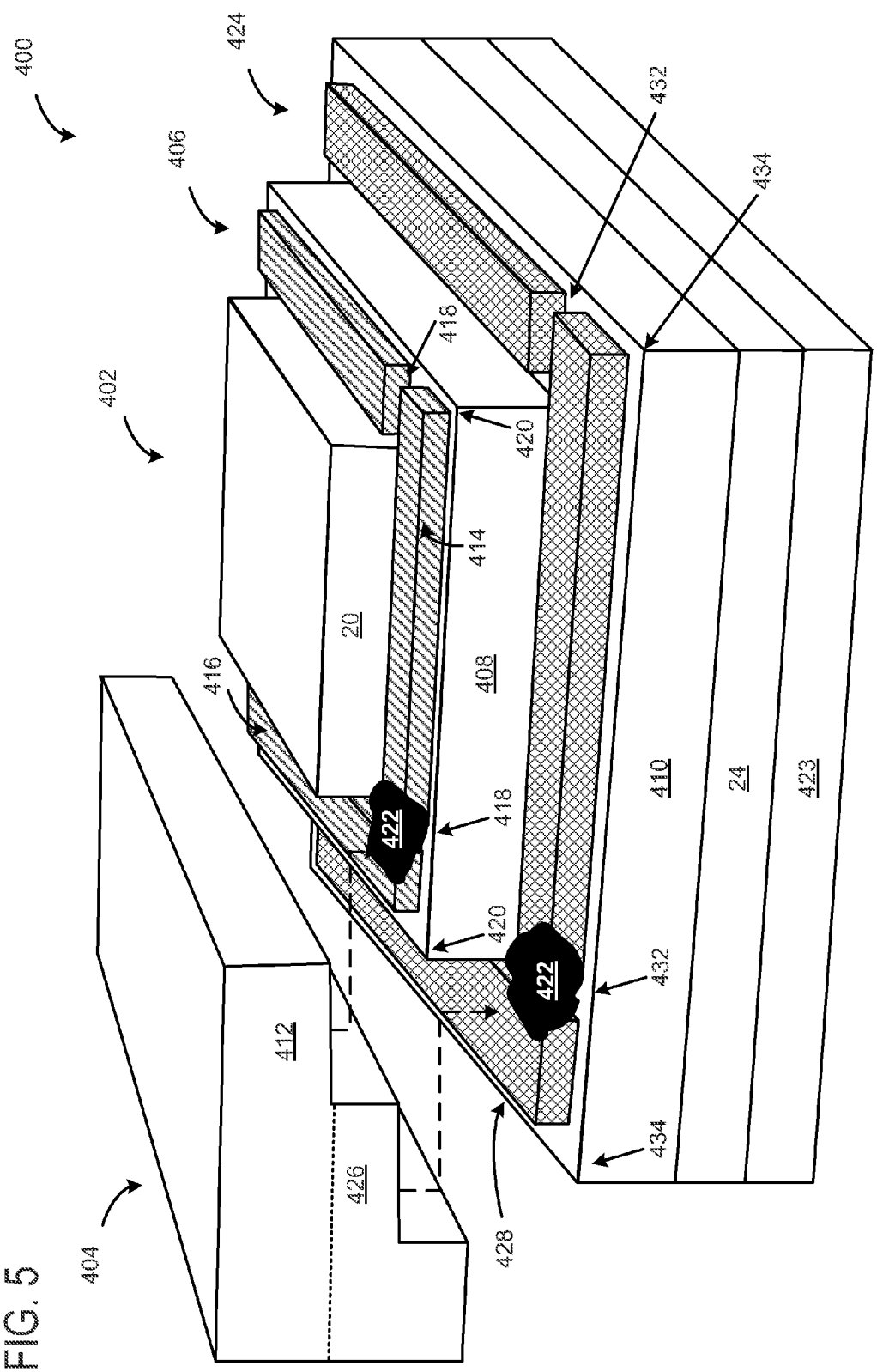
FIG. 5 is a schematic exploded view of the optical stack of FIG. 4.

FIGS. 4 and 5 show example embodiments of an optical stack assembly that includes fluid resistant features. FIG. 4 shows a cross sectional view of optical stack assembly 400 and FIG. 5 shows an exploded view of optical stack assembly 400.

As shown in FIGS. 4 and 5, optical stack assembly 400 may include a tiered optical stack 402, a tiered chassis 404, and a segmented gasket layer 406. Some features in FIGS. 4 and 5 have already been described with respect to FIGS. 2 and 3 and therefore are referenced with common numbers. As such, these features will not be discussed repetitively.

As shown in FIGS. 4 and 5, tiered optical stack 402 may include two or more layers including first display layer 408, and second display layer 410. First display layer 408 and second display layer 410 may correspond to different layers of an LCD panel, and/or various optical sheets, for example. While two layers are shown in the schematic representation, it should be understood that three or more layers are within the scope of this disclosure. It will be appreciated that first and second layers may be other layers compatible with the optical stack in any suitable order, as discussed above. Additionally, tiered optical stack 402 may include transparent cover layer 20.

First display layer 408 may have a size that is greater in at least one dimension than transparent cover layer 20. Likewise, second display layer 410 may have a size that is greater in at least one dimension than first tiered layer 408. In this way, the optical stack may form a tiered configuration.

Tiered chassis 404 may be configured to hold tiered optical stack 402 and serve as a mounting platform for tiered optical stack 402. As shown, tiered chassis 404 may include a first tiered layer 412 and a second tiered layer 426 that mirror the size and shape of the tiered optical stack 402. In this way, tiered chassis 404 accommodates the size and shape of tiered optical stack 402.

Segmented gasket layer 406 may be positioned between first display layer 408 of tiered optical stack 402 and the corresponding first tiered layer 412 of tiered chassis 404. As best shown in FIG. 5, segmented gasket layer 406 may include at least two segments 414 and 416 separated by a void 418, the two segments 414 and 416 meeting near a corner 420 of tiered optical stack 402. Further, void 418 may be filled with sealant 422 interposed between each segment. In this way, sealant 422 fills void 418 thereby collectively forming a fluid tight seal with sealant 422 and segmented gasket layer 406. Therefore, fluid may be averted away from an interior of the interactive display device such that fluid exposure to electronics 423 is reduced.

Sealant 422 may be made of any suitable material. As one example, sealant 422 is a silicone based sealant, such as silicone foam. For example, sealant 422 may be PORON, which is provided as one non-limiting example.

In some embodiments, segmented gasket layer 406 includes four segments wherein each segment coincides with a side of first display layer 408 and an analogous side of corresponding tiered layer 412 of the tiered chassis 404.

In some embodiments, segmented gasket layer 406 may be a first segmented gasket layer, wherein optical stack assembly 400 may optionally include a second segmented gasket layer 424. Second segmented gasket layer 424 may be positioned between second display layer 410 of tiered optical stack 402 and a corresponding second tiered layer 426 of tiered chassis 404. Similar to first segmented gasket layer 406, second segmented gasket layer 424 may include at least two segments 428 and 430 separated by a void 432. The two segments 428 and 430 may meet near a corner 434 of tiered optical stack 402. Further, the segment 428 may be bonded to segment 430 via sealant 422 thus filling void 432. In this way, sealant 422 fills void 432 thereby collectively forming a second fluid tight seal with sealant 422 and second segmented gasket layer 424. Therefore, fluid may be averted away from an interior of the interactive display device such that fluid exposure to electronics 423 is reduced.

Further in some embodiments, second segmented gasket layer 424 may include four segments. In such cases, each segment may coincide with a side of second display layer 410 and a respective side of corresponding tiered layer 426 of the tiered chassis 404.

Figure 6:
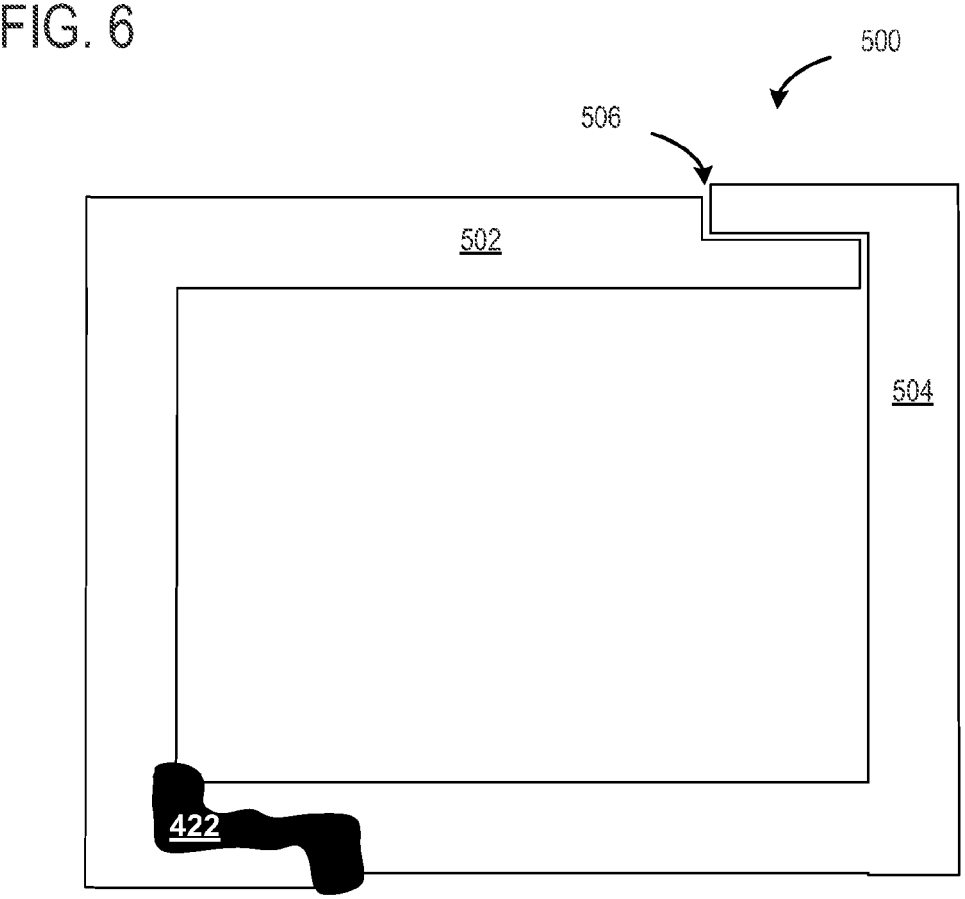
FIG. 6 is a top view of an example gasket layer in accordance with the fluid ingress resistant interactive display device of FIG. 4.

It will be appreciated that first and/or second segmented gasket layers may be any suitable shape or size. Further, the segmented gasket layers may have any number of segments that meet at virtually any location within the fluid ingress resistant interactive display device. For example, FIG. 6 shows a top view of a segmented gasket layer 500. As shown, first segment 502 and second segment 504 meet such that more than one surface of first segment 502 accommodates second segment 504. In the illustrated example, first segment 502 and second segment 504 meet such that three surfaces of first segment 502 are in close proximity to three opposing surfaces of second segment 504. Said in another way, the first and second segments are configured with an interlocking feature such that a seam between the first and second segments creates a stepwise gap 506. In this way, the gap 506 between the first and second segments may be filled with sealant 422 as described above.

FIGS. 4-6 are provided by way of example and are not meant to be limiting. It will be appreciated that the tiered configurations provided for the optical stack and the chassis may be tiered on one or more sides without departing from the scope of this disclosure. As one example, the one or more segmented gasket layers may be configured to overlap with each other, and the size and shape of the tiered layers may be configured to accommodate the overlapped segmented gasket layers. Further, it will be appreciated that gaskets and/or sealants may be additionally or alternatively applied to an interactive display device in configurations and/or orientations other than the continuous gasket layer and the one or more segmented gasket layers as described above.

Figure 7:
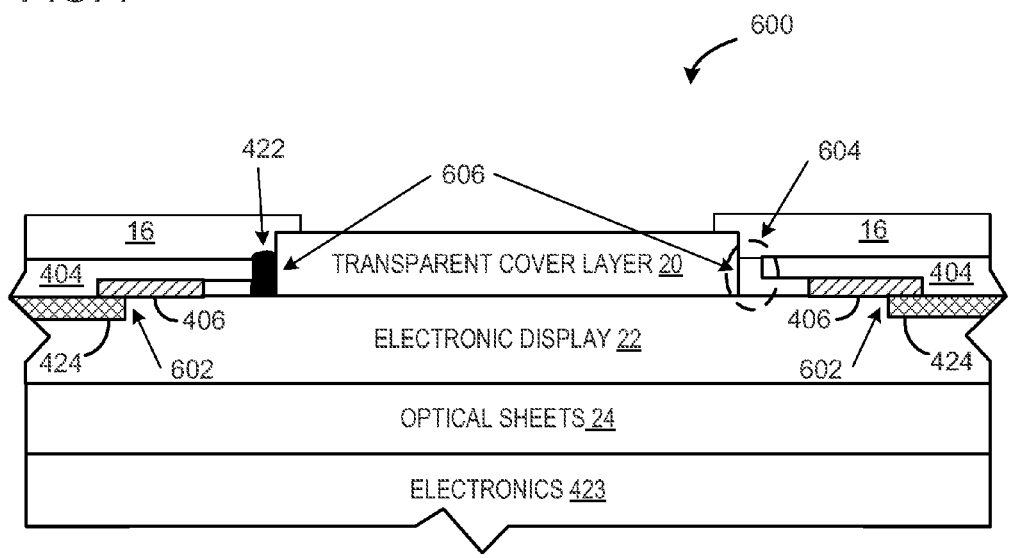
FIG. 7 is a schematic cross sectional view of another example fluid ingress resistant interactive display device.

For example, FIG. 7 shows a cross sectional view of fluid ingress resistant interactive display device 600 depicting an overlapped region 602 of segmented gasket layers 406 and 424. Such a configuration may increase the fluid ingress resistant potential of the device. Some features in FIG. 7 have already been described with respect to FIGS. 2-6 and therefore are referenced with common numbers. As such, these features will not be discussed repetitively.

As further illustrated in FIG. 7, interactive display device 600 may include void 604 between a portion of chassis 404 and a side perimeter surface 606 of transparent cover layer 20. Void 604 may be filled with sealant 422. In this way, fluid ingress may be averted from entering an interior beyond sealant 422 within interactive display device 600.

Figure 8:
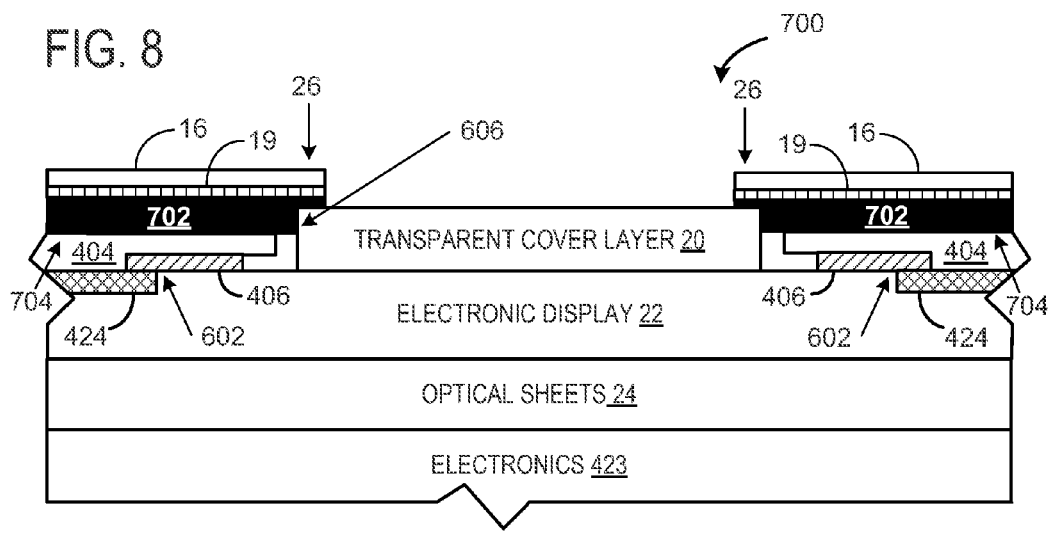
FIG. 8 is a schematic cross sectional view of another example fluid ingress resistant interactive display device.

FIG. 8 shows another example of a gasket that may be used additionally or alternatively to the gaskets and/or sealants described above. Some features in FIG. 8 have already been described with respect to FIGS. 2-7 and therefore are referenced with common numbers. As such, these features will not be discussed repetitively.

As shown, fluid ingress resistant interactive display device 700 may include gasket layer 702 between housing cover 16 and chassis 404. Similar to gasket layer 18 of FIG. 1, gasket layer 702 may include a portion affixed to housing cover 16 at frame rim 26 via bonding material 19, and pressure fit to a corresponding region of transparent cover layer 20. As shown, gasket layer 702 may extend beyond frame rim 26 to be affixed to a greater portion of housing cover 16. Further, gasket layer 702 may include a portion that is further affixed to a top surface of chassis 404 via bonding material 19.

Additionally, as shown, gasket layer 702 may include a portion that is pressure fit to side perimeter surface 606 of transparent cover layer 20. In other words, gasket layer 702 may be applied to transparent cover layer 20 on side perimeter surface 606 and a top surface corresponding to the frame rim overlapped region without a bonding material or an adhesive. In this way, fluid ingress may be averted from entering an interior beyond gasket layer 702 within interactive display device 700.

Figure 9:
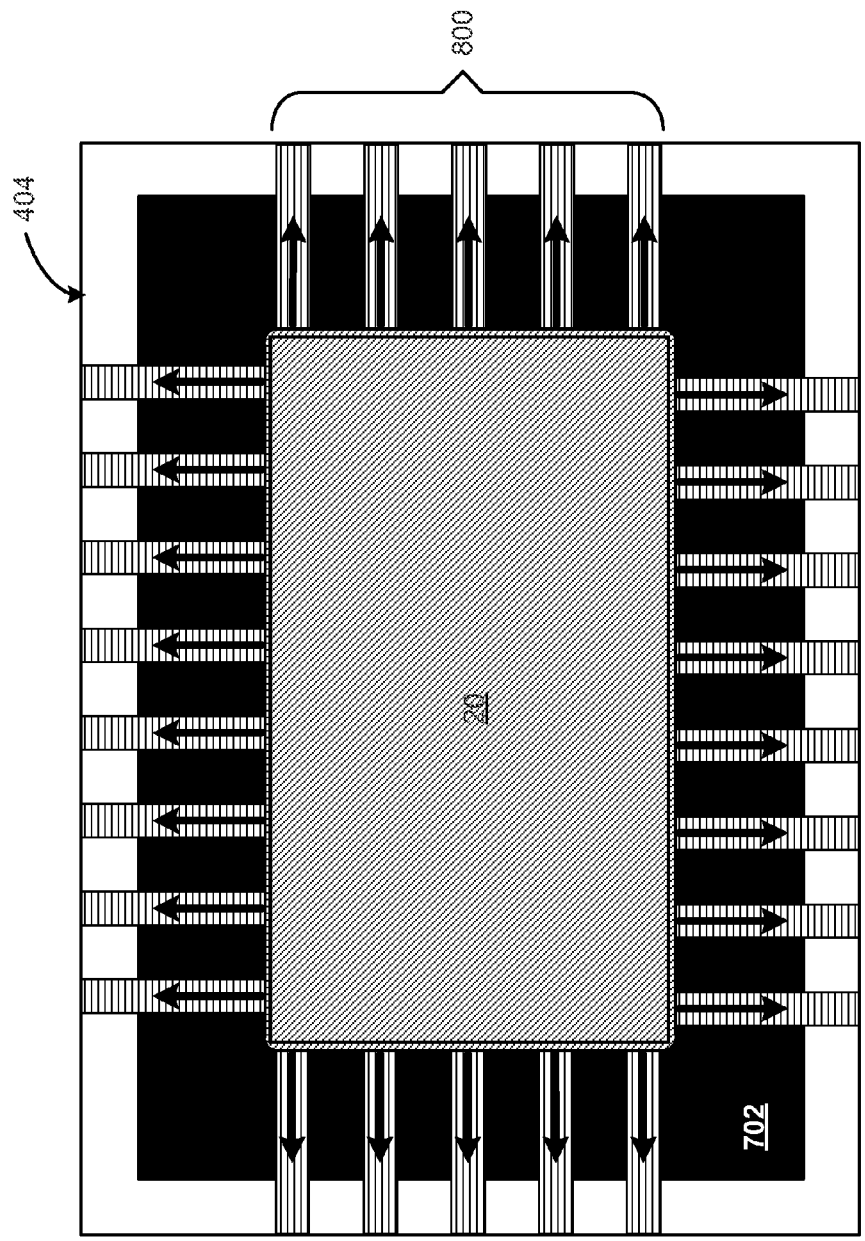
FIG. 9 is a top view of the fluid ingress resistant interactive display device of FIG. 8.

In some embodiments, the fluid ingress resistant interactive display device may additionally or alternatively include one or more channels to divert fluid away from an interior of the interactive display device. For example, FIG. 9 shows a top view of gasket layer 702 including example channels 800.

As shown, channels 800 may be a feature of gasket layer 702 and may be present in any number around a perimeter of gasket layer 702, for example. Channels 800 may have a downgraded slope such that fluid spilled on transparent cover layer 20 may be gravity fed through channels 800 to an exterior of the interactive display device. For example, an outer enclosure of the interactive display device may include venting holes to allow fluid to exit an interior of the interactive display device, for example. In this way, fluid may be diverted away from underlying electronic components thus protecting the interactive display device.

It will be appreciated that channels 800 may have any suitable shape and/or size. The example provided in FIG. 9 is non-limiting and it is to be understood that other configurations are possible without departing from the scope of this disclosure. Further, channels to divert fluid from an interior of the interactive display device may be configured to accommodate virtually any layer of the optical stack.

In this way, fluid may be inhibited from entering an interior of the device at virtually any level of the device. For example, one or more gaskets may inhibit fluid from entering the device at a component level and/or a system level. Further, fluid channels may additionally or alternatively inhibit fluid from contacting electronic components of the device by diverting fluid to an exterior of the device, as described above.

It is to be understood that the configurations and/or approaches described herein are exemplary in nature, and that these specific embodiments or examples are not to be considered in a limiting sense, because numerous variations are possible. Rather, the illustrations in FIGS. 1-9 and the accompanying descriptions are provided as example configurations of a fluid ingress resistant device and are not meant to be limiting in any sense. Further, the gaskets and sealants described above are provided as an example and other configurations are possible without departing from the scope of this disclosure.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A fluid ingress resistant interactive display device comprising:
    an optical stack including two or more tiered layers including an electronic display and a transparent cover layer;
    a chassis holding the optical stack and serving as a mounting platform for the optical stack;
    a housing cover including a frame rim defining a viewing window, the frame rim sized to overlap an entire perimeter of the transparent cover layer;
    a gasket layer between the transparent cover layer and the frame rim, the gasket layer affixed to the frame rim via a bonding material and pressure fit against the transparent cover layer; and
    a segmented gasket layer between a first tiered layer of the optical stack and a corresponding first tiered layer of the chassis.

2. The device of claim 1, wherein a void between a portion of the chassis and a side perimeter surface of the transparent cover layer is filled with a sealant.

3. The device of claim 1, wherein a portion of the gasket layer is further affixed to a top surface of the chassis via the bonding material.

4. The device of claim 3, wherein another portion of the gasket layer is further pressure fit to a side perimeter surface of the transparent cover layer.

5. The device of claim 1, further including a second segmented gasket layer between a second tiered layer of the optical stack and a corresponding second tiered layer of the chassis.

6. The device of claim 5, wherein each segment of the first and second segmented gasket layers meet at a corner of a respective tiered layer of the optical stack, wherein a first segment is bonded to a second segment at the corner via a sealant such that a void between the first and second segments is filled.

7. The device of claim 6, wherein the sealant is a silicone based material.

8. The device of claim 1, further comprising one or more fluid channels configured to divert fluid away from an interior of the device.

9. The device of claim 1, wherein the housing cover includes support mounts configured to hold the transparent cover layer in a horizontal orientation.

10. A fluid ingress resistant interactive display device comprising:
    a tiered optical stack including an electronic display and a transparent cover layer;
    a tiered chassis configured to hold the tiered optical stack and serve as a mounting platform for the tiered optical stack;
    a segmented gasket layer between a first tiered layer of the tiered optical stack and a corresponding first tiered layer of the tiered chassis, wherein the segmented gasket layer includes at least two segments separated by a void, the at least two segments meeting near a corner of the tiered optical stack; and
    a sealant interposed between each segment near the corner such that the sealant fills the void thereby collectively forming a fluid tight seal with the sealant and the segmented gasket layer.

11. The device of claim 10, wherein the segmented gasket layer includes four segments, wherein each segment coincides with a side of the first tiered layer of the optical stack and an analogous side of the corresponding tiered layer of the chassis.

12. The device of claim 10, further including a second segmented gasket layer between a second tiered layer of the optical stack and a corresponding second tiered layer of the chassis.

13. The device of claim 12, wherein a first electronic display layer is a liquid crystal display, and a second electronic display layer includes one or more optical sheets selected from the group consisting of a polarizing layer, a diffusing layer, an antireflective film, an antiglare film, a conductive film, a privacy film, and an electromagnetic interference filter.

14. The device of claim 10, wherein the sealant is a silicone based material.

15. The device of claim 10, further comprising one or more fluid channels configured to divert fluid away from an interior of the device.

16. A fluid ingress resistant interactive display device comprising:
    a tiered optical stack including a transparent cover layer, a liquid crystal display, and at least one optical sheet;
    a tiered chassis configured to hold the optical stack in a horizontal orientation and serve as a mounting platform for the optical stack;
    a first segmented gasket layer between the liquid crystal display and a corresponding first tiered layer of the tiered chassis; and
    a second segmented gasket layer between the optical sheet and a corresponding second tiered layer of the tiered chassis;
    wherein each segment of the first and second segmented gasket layers meet at a corner of a respective tiered layer of the optical stack, wherein a first segment is bonded to a second segment at the corner via a sealant such that a void between the first and second segments is filled.

17. The device of claim 16, further comprising a housing cover including a frame rim defining a viewing window, the frame rim sized to overlap an entire perimeter of the transparent cover layer.

18. The device of claim 17, further comprising a continuous gasket layer between the transparent cover layer and the frame rim, the continuous gasket layer affixed to the frame rim via a bonding material and pressure fit against the transparent cover layer.

* * * * *